United States Patent Office.

CAROL F. BATES, OF HUGHES SPRINGS, TEXAS.

MIXTURE FOR FISH-BAITS.

SPECIFICATION forming part of Letters Patent No. 306,896, dated October 21, 1884.

Application filed March 22, 1884. (No specimens.)

*To all whom it may concern:*

Be it known that I, C. F. BATES, of Hughes Springs, in the county of Cass and State of Texas, have invented certain new and useful Improvements in Mixtures for Fish-Baits; and I do hereby declare the following to be a full, clear, and exact description of the invention, such as will enable others skilled in the art to which it pertains to make and use it.

My invention relates to an improvement in mixtures for fish-baits; and it consists in an admixture that is composed of asafetida, oil of anise, and honey, as will be more fully set forth hereinafter.

In preparing my mixture I take of asafetida one-half of an ounce, and dissolve it in one pint of warm water. I then add one-half of an ounce of oil of anise and one-half of a pint of honey.

For buffalo-fishing I employ a bait that is composed of mush and raw cotton, and dip it into my mixture; but my mixture is adapted also to be used in connection with fish-bait of any kind.

I am aware that the use of anise-oil and asafetida in similar compounds to the one described by me is not new, and this I disclaim.

Having thus described my invention, I claim—

A mixture for fish-baits that is composed of asafetida, oil of anise, and honey, substantially as hereinbefore set forth.

In testimony whereof I affix my signature in presence of witnesses.

C. F. BATES.

Witnesses:
 A. S. PATTISON,
 C. REED,
 T. C. ARENDALE.